United States Patent
Li et al.

(10) Patent No.: US 10,306,205 B2
(45) Date of Patent: May 28, 2019

(54) IMAGE PROCESSING METHOD, APPARATUS, AND DISPLAY SYSTEM BASED ON PSYCHOVISUAL MODULATION

(71) Applicant: BOE TECHNOLOGY GROUP CO., LTD., Beijing (CN)

(72) Inventors: Wenbo Li, Beijing (CN); Guangtao Zhai, Beijing (CN); Zhongpai Gao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/324,717

(22) PCT Filed: Jun. 7, 2016

(86) PCT No.: PCT/CN2016/085098
§ 371 (c)(1),
(2) Date: Jan. 8, 2017

(87) PCT Pub. No.: WO2017/096774
PCT Pub. Date: Jun. 15, 2017

(65) Prior Publication Data
US 2018/0270470 A1    Sep. 20, 2018

(30) Foreign Application Priority Data
Dec. 7, 2015   (CN) .......................... 2015 1 0888637

(51) Int. Cl.
*H04N 13/15*   (2018.01)
*H04N 13/302*  (2018.01)
(Continued)

(52) U.S. Cl.
CPC ............... *H04N 13/15* (2018.05); *H04N 9/77* (2013.01); *H04N 13/302* (2018.05);
(Continued)

(58) Field of Classification Search
USPC .......................................................... 382/162
See application file for complete search history.

(56) References Cited

U.S. PATENT DOCUMENTS

2001/0022852 A1* 9/2001 Gicquel ................ G06T 7/0002
                                                382/162
2002/0047908 A1* 4/2002 Mise ..................... H04N 9/045
                                                348/222.1
(Continued)

OTHER PUBLICATIONS

International Search Report and Written Opinion dated Sep. 1, 2016 in PCT/CN2016/085098.

*Primary Examiner* — Jerome Grant, II
(74) *Attorney, Agent, or Firm* — SYNCODA LLC; Feng Ma

(57) ABSTRACT

An image processing method includes: determining chrominance information and luminance information of an input color image; iteratively solving one or more equations to obtain bases of the luminance and modulation weights of a plurality of basis element frames of the input color image based on the luminance information; determining bases of the chrominance of the basis element frames based on the modulation weights and the chrominance information; and converting the bases of the luminance and the bases of the chrominance of the basis element frames into an output image.

18 Claims, 8 Drawing Sheets

(51) Int. Cl.
*H04N 13/324* (2018.01)
*H04N 13/341* (2018.01)
*H04N 13/351* (2018.01)
*H04N 9/77* (2006.01)
*H04N 13/30* (2018.01)

(52) U.S. Cl.
CPC ......... *H04N 13/324* (2018.05); *H04N 13/341* (2018.05); *H04N 13/351* (2018.05); *H04N 2013/403* (2018.05)

(56) References Cited

U.S. PATENT DOCUMENTS

| | | | | |
|---|---|---|---|---|
| 2005/0008251 | A1* | 1/2005 | Chiang | G06T 5/003 382/266 |
| 2006/0238487 | A1* | 10/2006 | Shih | G09G 3/342 345/102 |
| 2013/0208810 | A1* | 8/2013 | Shen | H04N 19/82 375/240.26 |
| 2015/0172660 | A1* | 6/2015 | Wang | H04N 19/126 375/240.02 |
| 2015/0370075 | A1* | 12/2015 | Ato | G02B 27/017 359/240 |
| 2015/0379695 | A1* | 12/2015 | Naruse | H04N 1/409 348/234 |
| 2016/0360213 | A1* | 12/2016 | Lee | H04N 19/186 |

\* cited by examiner

IMAGE PROCESSING METHOD, APPARATUS, AND DISPLAY SYSTEM BASED ON PSYCHOVISUAL MODULATION

CROSS-REFERENCES TO RELATED APPLICATION

The present application claims priority to Chinese Patent Application No. 201510888637.3 filed on Dec. 7, 2015, the disclosure of which is hereby incorporated by reference in its entirety.

TECHNICAL FIELD

The present disclosure relates generally to image processing technology, and more specifically to an image processing method, apparatus, and display system.

BACKGROUND

In the progress of civilization, information display technology plays an indispensable role. Currently, a large and growing number of complex optical displays have profoundly changed the ways of people's learning, working, communication, entertainment, and social behaviors.

SUMMARY

The present disclosure provides an image processing method, an image processing apparatus, and a display system. The method can employ psychovisual modulation (PVM) with algorithms to drastically increase the processing speed when conducting PVM for color images.

In an aspect, an image processing method is provided, including: determining chrominance information and luminance information of an input color image; iteratively solving one or more equations to obtain bases of the luminance and modulation weights of a plurality of basis element frames of the input color image based on the luminance information; determining bases of the chrominance of the basis element frames based on the modulation weights and the chrominance information; and converting the bases of the luminance and the bases of the chrominance of the basis element frames into an output image.

In some embodiments, the input color image includes a naked-eye view and a non-naked-eye view.

In some embodiments, the non-naked-eye view is configured to be viewed through a light modulator.

In some embodiments, the light modulator comprises an auxiliary viewing device.

In some embodiments, the auxiliary viewing device comprises at least one of: liquid crystal glasses, a helmet mounted display, a virtual reality device, or an augmented reality device.

In some embodiments, the one or more equations include a non-negative matrix factorization equation of psychovisual modulation (PVM).

In some embodiments, the PVM comprises a temporal PVM (TPVM).

In some embodiments, the one or more equations include a non-negative matrix factorization equation of TPVM.

In some embodiments, the one or more equations include:

$$\min_{0 \leq X_Y, W \leq 1} \|sY - X_Y W\|_F^2 + \alpha^2 \|s_0 Y_0 - X_Y 1\|_F^2;$$

wherein s represents a light intensity coefficient of the non-naked-eye view, $s_o$ represents a light intensity coefficient of a naked-eye view, $\alpha$ represents a penalty factor for adjusting a relative factorization quality of the naked-eye view and the non-naked-eye view, $X_Y$ represents the bases of the luminance of the basis element frames, W represents the modulation weight, Y represents the luminance information of the non-naked-eye view, $Y_0$ represents the luminance information of the naked-eye view.

In some embodiments, the determining the bases of the chrominance comprises solving:

$$\min_{0 \leq X_U \leq 1} \|s(U - 0.5) - (X_U - 0.5)W\|_F^2 + \alpha^2 \|s_0(U_0 - 0.5) - (X_U - 0.5)1\|_F^2,$$

$$\min_{0 \leq X_V \leq 1} \|s(V - 0.5) - (X_V - 0.5)W\|_F^2 + \alpha^2 \|s_0(V_0 - 0.5) - (X_V - 0.5)1\|_F^2,$$

wherein $X_U$ and $X_V$ represent the bases of the chrominance of the basis element frames, U and V represent the chrominance information of the non-naked-eye view, $U_0$ and $V_0$ represent the chrominance information of the naked-eye view.

In some embodiments, the method further includes: determining the chrominance information and the luminance information of the input color image by solving:

$$\begin{bmatrix} r \\ g \\ b \end{bmatrix} = \begin{bmatrix} 1 & 0 & 1.402 \\ 1 & -0.34414 & -0.71414 \\ 1 & 1.772 & 0 \end{bmatrix} \begin{bmatrix} y \\ u - 128 \\ v - 128 \end{bmatrix},$$

wherein y represents the luminance information of the input color image, u and v represent the chrominance information of the input color image, r, g, and b represent RGB input signals of the input color image.

In some embodiments, the converting comprises:
converting the bases of the luminance of the basis element frames and the bases of the chrominance of the basis element frames into output RGB signals of the basis element frames through:

$$\begin{bmatrix} R \\ G \\ B \end{bmatrix} = \begin{bmatrix} 1 & 0 & 1.402 \\ 1 & -0.34414 & -0.71414 \\ 1 & 1.772 & 0 \end{bmatrix} \begin{bmatrix} X_y \\ X_u - 128 \\ X_v - 128 \end{bmatrix},$$

wherein $X_Y$ represents the bases of the luminance of the basis element frames, $X_U$ and $X_V$ represent the bases of the chrominance of the basis element frames, R, G, and B respectively represent output RGB signals of the basis element frames.

In another aspect, an image processing apparatus is provided including: a first converting circuit configured to determine chrominance information and luminance information of an input color image; a first processing circuit configured to iteratively solve one or more equations to obtain bases of the luminance and modulation weights of a plurality of basis element frames of the input color image based on the luminance information; a second processing circuit configured to determine bases of the chrominance of the basis element frames based on the modulation weights and the chrominance information; and a second converting circuit configured to convert the bases of the luminance and the bases of the chrominance of the basis element frames into an output image.

In some embodiments, the input color image includes a naked-eye view and a non-naked-eye view.

In some embodiments, the non-naked-eye view is configured to be viewed through a light modulator.

In some embodiments, the light modulator comprises an auxiliary viewing device.

In some embodiments, the auxiliary viewing device comprises at least one of: liquid crystal glasses, a helmet mounted display, a virtual reality device, or an augmented reality device.

In some embodiments, the first processing circuit is configured to solve a non-negative matrix factorization equation of psychovisual modulation (PVM)

In some embodiments, the PVM comprises a temporal PVM (TPVM).

In some embodiments, the first processing circuit is configured to solve a non-negative matrix factorization equation of TPVM.

In some embodiments, the first processing circuit is configured to solve iteratively:

$$\min_{0 \leq X_Y, W \leq 1} \|sY - X_Y W\|_F^2 + \alpha^2 \|s_0 Y_0 - X_Y 1\|_F^2$$

based on the luminance information of the color image to obtain the bases of the luminance and the modulation weights of the basis element frames;

wherein s represents a light intensity coefficient of the non-naked-eye view, $s_o$ represents a light intensity coefficient of a naked-eye view, α represents a penalty factor for adjusting a relative factorization quality of the naked-eye view and the non-naked-eye view, $X_Y$ represents the bases of the luminance of the basis element frames, W represents the modulation weight, Y represents the luminance information of the non-naked-eye view, $Y_0$ represents the luminance information of the naked-eye view.

In some embodiments, the second processing circuit is configured to determine:

$$\min_{0 \leq X_U \leq 1} \|s(U - 0.5) - (X_U - 0.5)W\|_F^2 + \alpha^2 \|s_0(U_0 - 0.5) - (X_U - 0.5)1\|_F^2,$$

$$\min_{0 \leq X_V \leq 1} \|s(V - 0.5) - (X_V - 0.5)W\|_F^2 + \alpha^2 \|s_0(V_0 - 0.5) - (X_V - 0.5)1\|_F^2,$$

wherein $X_U$ and $X_V$ represent the bases of the chrominance of the basis element frames, U and V represent the chrominance information of the non-naked-eye view, $U_0$ and $V_0$ represent the chrominance information of the naked-eye view.

In some embodiments, the apparatus is further configured to:

determine the chrominance information and the luminance information of the input color image by solving:

$$\begin{bmatrix} r \\ g \\ b \end{bmatrix} = \begin{bmatrix} 1 & 0 & 1.402 \\ 1 & -0.34414 & -0.71414 \\ 1 & 1.772 & 0 \end{bmatrix} \begin{bmatrix} y \\ u - 128 \\ v - 128 \end{bmatrix}$$

wherein y represents the luminance information of the input color image, u and v represent the chrominance information of the input color image, r, g, and b represent RGB input signals of the input color image.

In some embodiments, the apparatus is further configured to:

convert the bases of the luminance of the basis element frames and the bases of the chrominance of the basis element frames into output RGB signals of the basis element frames through:

$$\begin{bmatrix} R \\ G \\ B \end{bmatrix} = \begin{bmatrix} 1 & 0 & 1.402 \\ 1 & -0.34414 & -0.71414 \\ 1 & 1.772 & 0 \end{bmatrix} \begin{bmatrix} X_y \\ X_u - 128 \\ X_v - 128 \end{bmatrix},$$

wherein $X_Y$ represents the bases of the luminance of the basis element frames, $X_U$ and $X_V$ represent the bases of the chrominance of the basis element frames, R, G, and B respectively represent output RGB signals of the basis element frames.

In another aspect, an image processing system is provided including:

an image processing apparatus described above; and an auxiliary viewing apparatus configured to modulate an output image from the image processing apparatus.

In some embodiments, the image processing system further includes a display configured to present the output image.

In some embodiments, the display comprises at least one of a liquid crystal display (LCD), a light-emitting diode (LED) display, or a projector.

In some embodiments, the auxiliary viewing device comprises at least one of liquid crystal glasses, a helmet mounted display (HMD), a virtual reality (VR) device, or an augmented reality (AR) device.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

Figure 1:
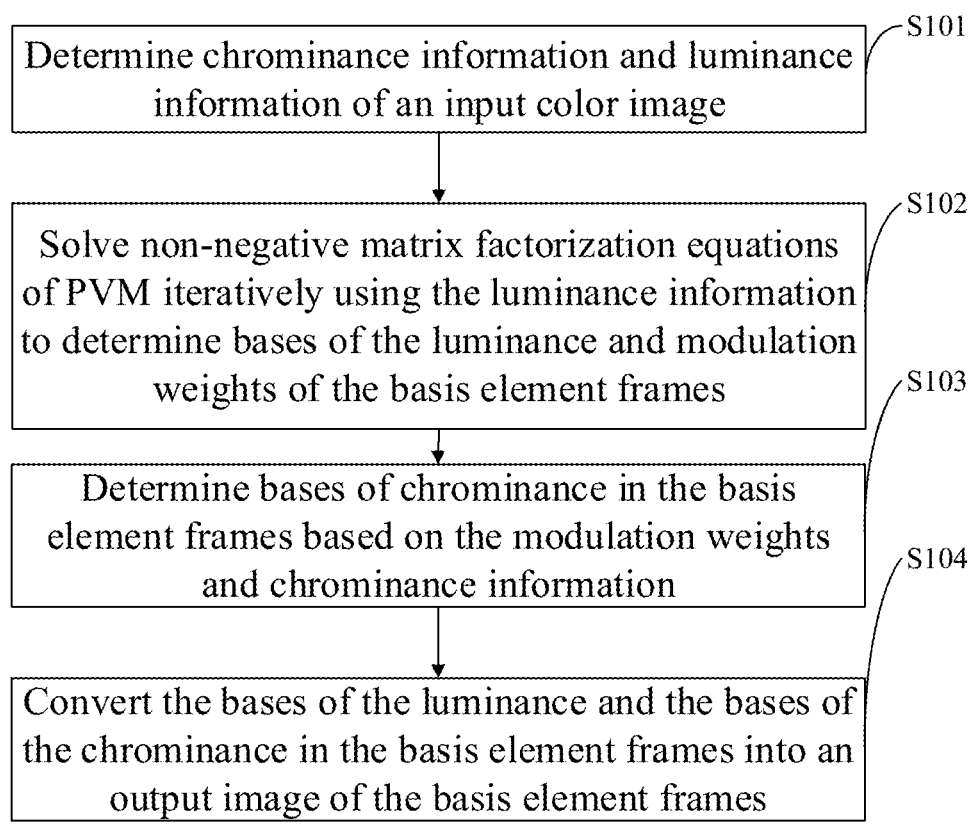
FIG. 1 is a flowchart of an image processing method based on PVM according to some embodiments.

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

Various embodiments disclosed herein adopt psychovisual modulation (PVM), integrating signal processing, optoelectronics, and psychophysics. PVM technology utilizes a psychophysical visual phenomena: the brain's human visual system (HVS) cannot distinguish between rapidly-changing optical signals faster than the flicker fusion frequency (for most observers, this frequency is around 60 Hz).

Modern display technologies have produced optoelectronic display devices with refresh rates of 120 Hz, 240 Hz, or higher. Other types of displays can have higher refreshing rates. For example, a digital projector employing shape-variable mirrors and grating light switches can have a refresh rate of 88 kHz or higher, as well as high spatial resolutions. Therefore, in high-frequency optoelectronic display devices, the visible spectrum can present information more than any observer can absorb through the visual stimuli. As such, a single optoelectronic display device can have additional capacity (i.e., psychological visual redundancy) that can generate different views for different observers.

The redundancy can be in the high refresh rates of the displays, or in the high resolutions of the displays. Accordingly, in some embodiments, Temporal PVM (TPVM) can be employed. In some embodiments, PVM can be extended into the spatial domain, and Spatial PVM (SPVM) can be employed.

Psychovisual modulation display technology can be achieved by displaying a number of basis element frames (sometimes referred to as "atom frames") with a high-frequency optoelectronic display apparatus (such as an LCD screen, an LED screen, an OLED screen, a projector, etc), and employing an auxiliary viewing device (such as a dynamic liquid crystal glasses synchronized with the display screen).

The auxiliary viewing device can act as a light modulator to modulate the light from the screen to thereby present the non-naked-eye view to the user. The optoelectronic display apparatus transmits a group of high-frequency images (e.g., basis element frames). Prior to entering the HVS, these basis element frames can be synchronously modulated by the auxiliary viewing device worn by the viewers, then integrated into a target image in the HVS. As such, through auxiliary viewing devices with different modulation weights, different viewers can see different pictures from the same display apparatus screen at the same time.

In the above displaying process, when designing the output images of the basis element frames and modulation weights of auxiliary viewing devices through the target images that will be formed, due to non-negative nature of the values of modulation weights and the values of luminance of the target images, the factorization of TPVM signals can be treated as a non-negative matrix factorization (NMF) problem. The values of modulation weights and the grayscale values of the target images are not infinitely large, i.e., there is an upper bound constraint. Therefore, the factorization of TPVM signal can be solved as an NMF problem with the upper bound constraint.

In a method disclosed in CN patent application No. 2015102900093.0, through additional constraint and expansion during NMF, a clear naked eye image can be provided for viewers without wearing the auxiliary viewing devices. However, when performing NMF using this method, because the size of color images is three times the size of gray-scale images, the time for formula factorization will be greatly increased for color images compared with gray-scale image when applying NMF to the TPVM signals. As such, the processing speed of the display system to generate output image of basis element frames will be adversely affected.

Some embodiments of the present disclosure provide an image processing method based on PVM. As shown in FIG. 1, an example method can include the following steps:

S101. Determining chrominance information and luminance information of an input color image; the color image includes a naked-eye view and a non-naked-eye view. For example, in the input color image, which frames are naked-eye views and which frames are non-naked-eye views can be predetermined.

The "naked-eye view" can be used to refer to a view seen by a user without wearing an auxiliary viewing device according to some embodiments disclosed herein. However, when the user wears conventional vision correction glasses, such as near-vision glasses, far-vision glasses, sunglasses, the view is still considered the naked-eye view. The "non-naked-eye view" on the other hand can be used to refer to a view seen by a user wearing an auxiliary viewing device that is configured to function with the image processing apparatus according to some embodiments disclosed herein.

The auxiliary viewing devices can be, for example, in the form of liquid crystal glasses, Helmet-Mounted Displays (HMD), virtual reality (VR) devices, augmented reality (AR) devices, Head-Up Displays (HUD) etc. The auxiliary viewing device can modulate the light from the display (such as a liquid crystal display (LCD), a light-emitting diode (LED) display, an organic LED (OLED) display, or a projector) to provide the user with the reconstructed image in the non-naked-eye view.

S102. Solving non-negative matrix factorization equations of PVM through an iterative method using the predetermined luminance information, to determine bases of the luminance and modulation weights of the basis element frames.

S103. Determining bases of the chrominance in the basis element frames based on the predetermined modulation weights and chrominance information;

S104. Converting the determined bases of the luminance and bases of the chrominance in the basis element frames into an output image of the basis element frames.

The above-described image processing method based on psychovisual modulation provided by the embodiments of the present disclosure employ the following techniques: most of the information of the color image is concentrated in the luminance information; as such, the visual quality is not significantly reduced when the sampling rate of the chrominance channel is lower than the sampling rate of the luminance channel; during the PVM factorization process, first only factorizing the luminance information of color image to obtain some parameters (e.g., the bases of the luminance) and the modulation weights of basis element frames, then determining other parameters (e.g., the bases of the chrominance) based on the obtained modulation weights.

Because only the luminance information is factorized in the process of psychovisual modulation factorization provided by the above-described image processing method of the embodiments of the present disclosure, in comparison with some methods of factorizing the luminance information and chrominance information in the image at the same time when factorizing the RGB format color image, the processing speed can be improved. For example, the processing time can be less than half of the other methods. In addition, because the bases of the luminance contain most of the information of the color image, only factorizing the luminance information can still ensure the quality of the reconstructed image.

Specifically, in the above-described image processing method according to some embodiments of the present disclosure, typically the input signal received is a color image in RGB format. However, luminance information (Y) takes more bandwidth than chrominance information (UV) in the YUV format color image, which enables the visual quality not to be apparently reduced when the sampling rate at chrominance channel is lower than the sampling rate at the luminance channel. In order to facilitate factorization of only the luminance information of the color image, prior to the factorization of the color image, step S101 needs to be executed. At step S101, the inputted color image in RGB format is converted to YUV format. When implementing it, in step S101, the conversion from the RGB format to the YUV format can be done through the following formula to determine the luminance information and the chrominance information in the color image:

$$\begin{bmatrix} r \\ g \\ b \end{bmatrix} = \begin{bmatrix} 1 & 0 & 1.402 \\ 1 & -0.34414 & -0.71414 \\ 1 & 1.772 & 0 \end{bmatrix} \begin{bmatrix} y \\ u-128 \\ v-128 \end{bmatrix},$$

wherein, y represents the luminance information of the color image, u and v represent the chrominance information of the color image, r, g, and b respectively represent the RGB input signals of the color image.

Further, $R \in \square^{N \times K}$, $G \in \square^{N \times K}$, $B \in \square^{N \times K}$ can be used to represent three color information of all N pixels of K frames of a color image, and the 3*3 large matrix at the right hand of the above formula can be represented as $A \in \square^{3N \times 3N}$, then the above formula can be simplified as: $[R^T|G^T|B^T]^T = A[Y^T|U^T-0.5|V^T-0.5]^T$.

Put it into the non-negative matrix equation factorizing objective function, then the equation factorizing objective function can be converted into the following form:

$$\min_{0 \leq X_V, X_U, X_Y, W \leq 1} \left\| A \left( s \begin{bmatrix} Y \\ U-0.5 \\ V-0.5 \end{bmatrix} - \begin{bmatrix} X_Y \\ X_U-0.5 \\ X_V-0.5 \end{bmatrix} W \right) \right\|_F^2 +$$

$$\alpha^2 \left\| A \left( s_0 \begin{bmatrix} Y_0 \\ U_0-0.5 \\ V_0-0.5 \end{bmatrix} - \begin{bmatrix} X_Y \\ X_U-0.5 \\ X_V-0.5 \end{bmatrix} 1 \right) \right\|_F^2,$$

wherein, $X_Y$ represents the bases of the luminance in the basis element frames, $X_U$ and $X_V$ respectively represent the bases of the chrominance in the basis element frames. Because A is a constant matrix, its impact can be neglected. When factorizing the color image in the RGB format, the luminance information and the chrominance information in the image are factorized at the same time, and the luminance information contains most of the information of the color image. As such, the luminance information of the color image alone can be factorized first to obtain the bases of the luminance $X_Y$ and the modulation weight W of the basis element frames.

Specifically, in above-described image processing method provided by some embodiments of the present disclosure, step S102 utilizes the predetermined luminance information to solve the non-negative matrix factorization equation of the PVM through an iterative method to determine the bases of the luminance and the modulation weights in the basis element frames. More specifically, the method may include: solving the following equation through the iterative method using the predetermined luminance information of the color image to obtain the bases of the luminance and the modulation weights in the basis element frames:

$$\min_{0 \leq X_Y, W \leq 1} \|sY - X_Y W\|_F^2 + \alpha^2 \|s_0 Y_0 - X_Y 1\|_F^2,$$

wherein s represents the coefficient of the light intensity of the non-naked-eye view, $s_0$ represents the coefficient of the light intensity of the naked-eye view, α represents a penalty factor used for adjusting the relative factorization quality of the naked-eye view and the non-naked-eye view, $X_Y$ represents the bases of the luminance of the basis element frames, W represents modulation weights, Y represents the luminance information of the non-naked-eye view, $Y_0$ represents the luminance information of the naked-eye view.

Specifically, in the above image processing method provided by some embodiments of the present disclosure, step S103 determines the bases of the chrominance in the basis element frames according to the predetermined modulation weights and the chrominance information. More specifically, the method can include: determining the bases of the chrominance in the basis element frames through the following formula according to the predetermined modulation weights and the chrominance information:

$$\min_{0 \leq X_U \leq 1} \|s(U-0.5) - (X_U-0.5)W\|_F^2 + \alpha^2 \|s_0(U_0-0.5) - (X_U-0.5)1\|_F^2;$$

$$\min_{0 \leq X_V \leq 1} \|s(V-0.5) - (X_V-0.5)W\|_F^2 + \alpha^2 \|s_0(V_0-0.5) - (X_V-0.5)1\|_F^2,$$

wherein s represents the coefficient of luminance intensity of the non-naked-eye view, $s_0$ represents the coefficient of luminance intensity of the naked-eye view, α represents the penalty factor used for adjusting the relative factorization quality of the naked-eye view and the non-naked-eye view, $X_U$ and $X_V$ respectively represent the bases of the chrominance of the basis element frames, U and V respectively represent the chrominance information of non-naked-eye view, $U_0$ and $V_0$, respectively represent the chrominance information of the naked-eye view.

Calculations in the above step S103 do not necessarily require an iterative process, therefore it will not use too much processing time.

Further, in the above image processing method provided by some embodiments of the present disclosure, after going through step S102 and step S103, the luminance information and the chrominance information of the basis element frames can be obtained. Next, executing step S104 to convert the predetermined bases of the luminance and bases of the chrominance in the basis element frames into an output image of the basis element frames. Specifically, the method can include converting the bases of the luminance and the bases of the chrominance in the basis element frames into the RGB output signals of the basis element frames through the following formula:

$$\begin{bmatrix} R \\ G \\ B \end{bmatrix} = \begin{bmatrix} 1 & 0 & 1.402 \\ 1 & -0.34414 & -0.71414 \\ 1 & 1.772 & 0 \end{bmatrix} \begin{bmatrix} Xy \\ Xu - 128 \\ Xv - 128 \end{bmatrix},$$

wherein $X_Y$ represents the bases of the luminance in the basis element frames, $X_U$ and $X_V$ respectively represent the bases of the chrominance in the basis element frames; R, G, and B respectively represent the RGB output signals of the basis element frames.

For example, four color images with a resolution of 288*352 and 300 frames can be used as input to implement above-described image processing method. Such an example is illustrated in FIGS. 5A-5D, wherein FIG. 5A illustrates image reconstruction using a database "Coast Guard," FIG. 5B illustrates image reconstruction using a database "Container," FIG. 5C illustrates image reconstruction using a database "Foreman," and FIG. 5D illustrates image reconstruction using a database "Hall Monitor." These databases can be downloaded from the Internet.

In each of FIGS. 5A-5D, the first rows are the original images, the second rows are images reconstructed using a conventional method, the third rows are images reconstructed using a method disclosed herein. The first columns are the naked-eye views, and the remaining three columns are randomly selected objective (target) views.

Based on the PVM provided by some embodiments of the present disclosure, and using conventional image processing method based on PVM as a comparative example, the reconstructed image can be obtained. By way of an example, the method can include selecting the first frame as the naked-eye view and the next 80 frames as the non-naked-eye view, setting the number of the basis element frames M=16 based on the refresh rate (fd) of the display apparatus.

Figure 2A:
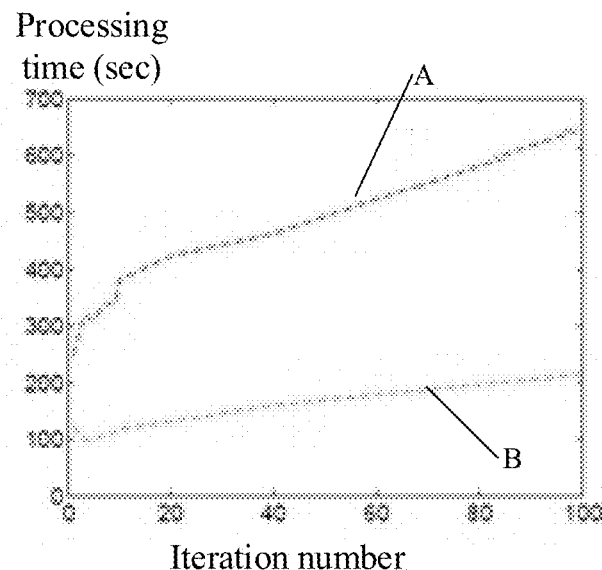
FIG. 2A illustrates the processing time versus the number of iterations when reconstructing the images shown in FIG. 5A.
Figure 2B:
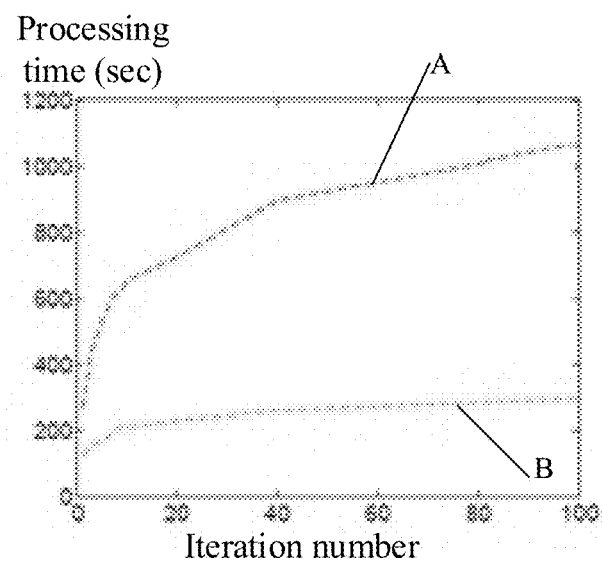
FIG. 2B illustrates the processing time versus the number of iterations when reconstructing the images shown in FIG. 5B.
Figure 2C:
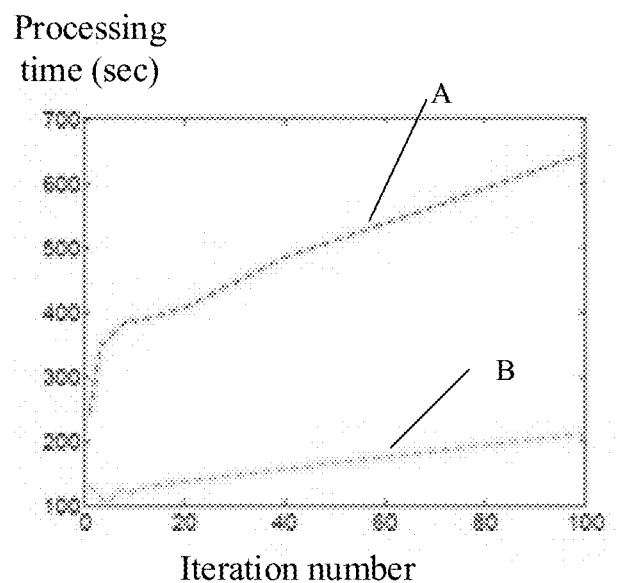
FIG. 2C illustrates the processing time versus the number of iterations when reconstructing the images shown in FIG. 5C.
Figure 2D:
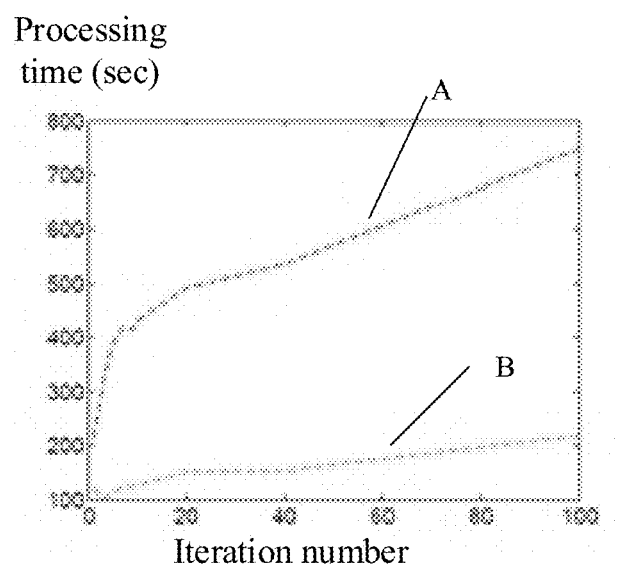
FIG. 2D illustrates the processing time versus the number of iterations when reconstructing the images shown in FIG. 5D.
Figure 5A:
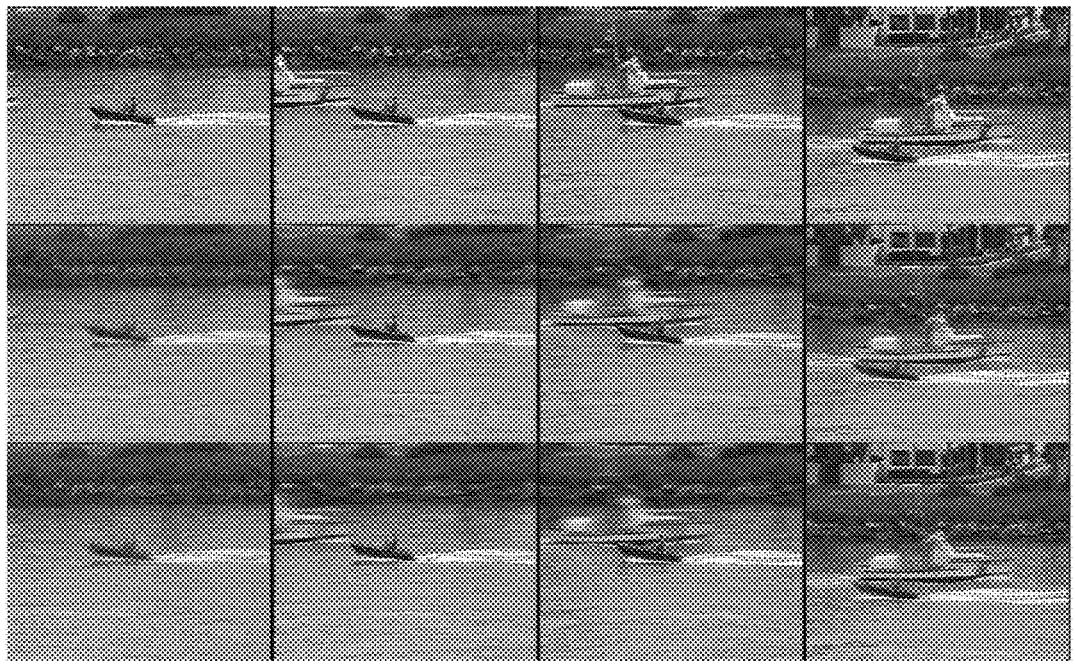
FIG. 5A illustrates image reconstruction using a database "Coast Guard;"
Figure 5B:
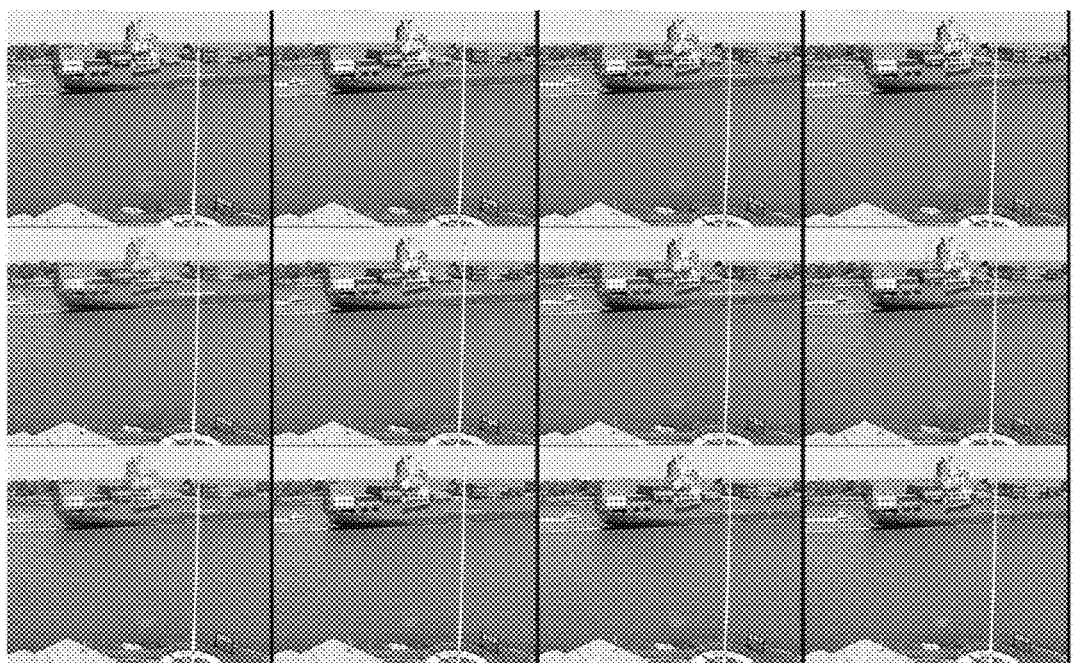
FIG. 5B illustrates image reconstruction using a database "Container;"
Figure 5C:
FIG. 5C illustrates image reconstruction using a database "Foreman;"
Figure 5D:
FIG. 5D illustrates image reconstruction using a database "Hall Monitor." These databases can be downloaded from the Internet. In each of FIGS. 5A-5D, the first rows are the original images, the second rows are images reconstructed using a conventional method, the third rows are images reconstructed using a method disclosed herein. The first columns are the naked-eye views, and the remaining three columns are randomly selected objective (target) views.

FIG. 2A illustrates the processing time versus the number of iterations when reconstructing the images shown in FIG. 5A. FIG. 2B illustrates the processing time versus the number of iterations when reconstructing the images shown in FIG. 5B. FIG. 2C illustrates the processing time versus the number of iterations when reconstructing the images shown in FIG. 5C. FIG. 2D illustrates the processing time versus the number of iterations when reconstructing the images shown in FIG. 5D.

As shown in FIGS. 2A through 2D, the processing times using the above-described image processing method based on the PVM provided by some embodiments of the present disclosure (indicated by symbol "B") are drastically reduced compared with the processing times when using a conventional image processing method (indicated by symbol "A").

Range of Variability (ROV) is a parameter used to measure the reconstruction function, and represents the similarity between the reconstructed image and the original image. The smaller the value of ROV, the closer the reconstructed image is to the original image, that is, the better the reconstruction effect.

Figure 3A:
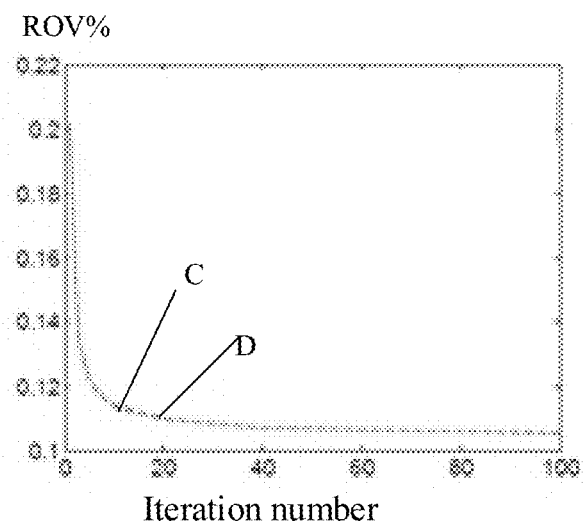
FIG. 3A illustrates a Range of Variability (ROV) versus the number of iterations when reconstructing the images shown in FIG. 5A.
Figure 3B:
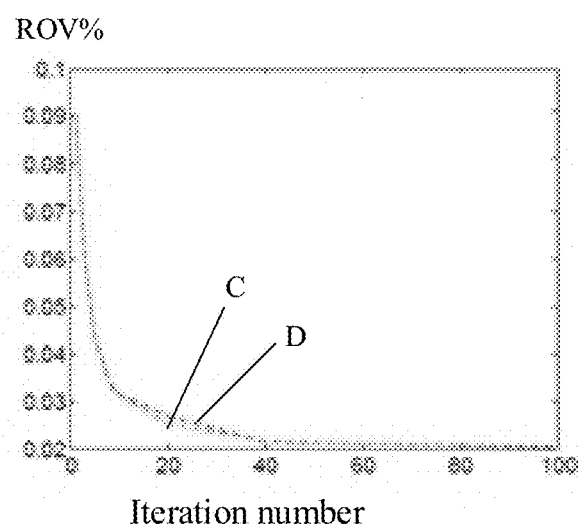
FIG. 3B illustrates the ROV versus the number of iterations when reconstructing the images shown in FIG. 5B.
Figure 3C:
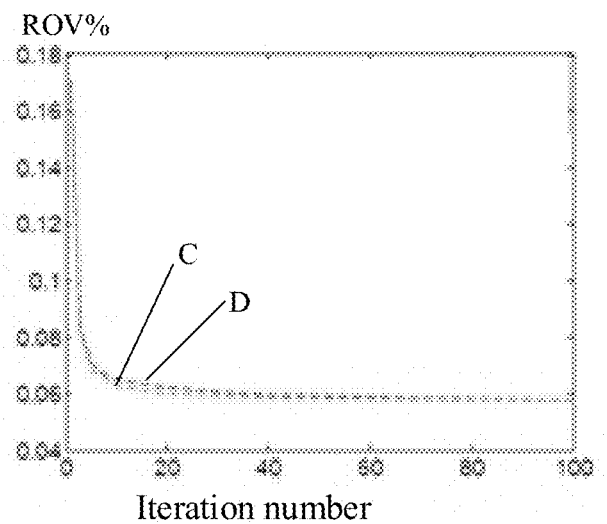
FIG. 3C illustrates the ROV versus the number of iterations when reconstructing the images shown in FIG. 5C.
Figure 3D:
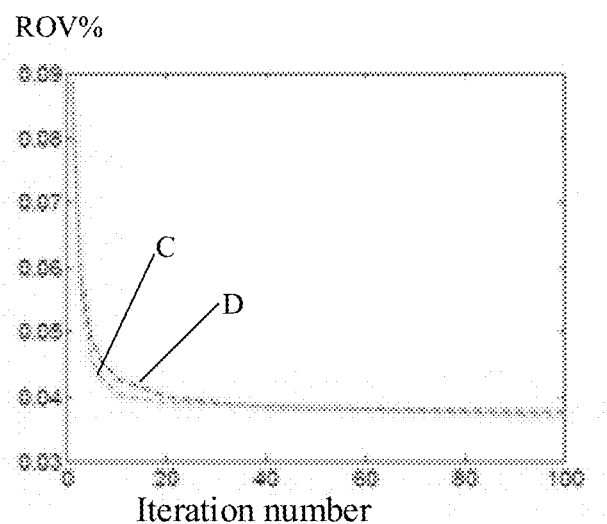
FIG. 3D illustrates the ROV versus the number of iterations when reconstructing the images shown in FIG. 5D.

FIG. 3A illustrates the ROV versus the number of iterations when reconstructing the images shown in FIG. 5A. FIG. 3B illustrates the ROV versus the number of iterations when reconstructing the images shown in FIG. 5B. FIG. 3C illustrates the ROV versus the number of iterations when reconstructing the images shown in FIG. 5C. FIG. 3D illustrates the ROV versus the number of iterations when reconstructing the images shown in FIG. 5D.

As can be seen from FIGS. 3A through 3D, the quality of the reconstructed image C using the above-described image processing method based on PVM according to some embodiments of the present disclosure is close to the quality of image D obtained through a conventional method. Similarly, also can be seen from the images in FIGS. 5A-5D, the reconstructed images using the above-described image processing method based on PVM according to some embodiments of the present disclosure have a quality similar to the quality of images obtained through a conventional method.

Some embodiments of the present disclosure also provide an image processing apparatus based on PVM, employing the principles similar to those of the above-described image processing method.

Figure 4:
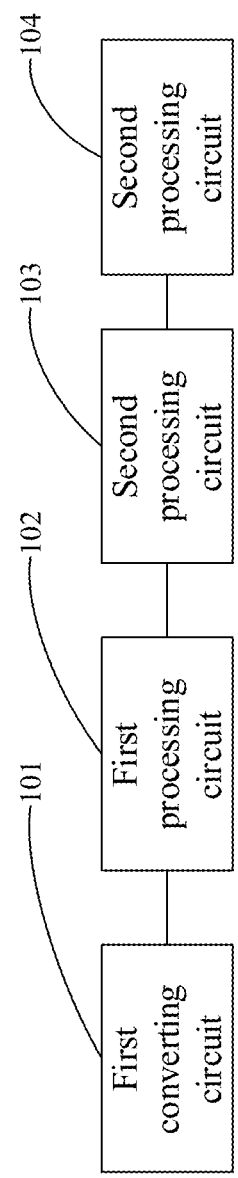
FIG. 4 is a schematic view of the structure of the image processing apparatus based on PVM according to some embodiments.

Specifically, some embodiments of the present disclosure provide an image processing apparatus based on PVM as shown in FIG. 4. The apparatus can include:

A first converting circuit 101 configured to determine the chrominance information and the luminance information of the input color image; the color image including a naked-eye view and a non-naked-eye view;

A first processing circuit 102 configured to solve non-negative matrix factorization equations of PVM through an iterative method using the predetermined luminance information to determine the bases of the luminance and the modulation weights in the basis element frames;

A second processing circuit 103 configured to determine the bases of the chrominance in the basis element frames according to the predetermined modulation weights and the chrominance information; and A second converting circuit 104 configured to convert the predetermined bases of the luminance and bases of the chrominance in the basis element frames into an output image of the basis element frames.

The first converting circuit 101, first processing circuit 102, second processing circuit 103, second converting circuit 104 can be realized in different ways according to different embodiments. For example, they can be realized using one or more general-purpose processors, or graphic processors. They can be realized using hardware, or using software. They can be realized integrally on one processor, or implemented as separate components or circuits.

Further, in the above-described image processing apparatus provided by some embodiments of the present disclosure, the first processing circuit 102 can be configured to solve the following the equation using the predetermined luminance information of the color image through the iterative method to obtain the bases of the luminance and the modulation weights in the basis element frames:

$$\min_{0\le X_Y, W\le 1} \|sY - X_Y W\|_F^2 + \alpha^2 \|s_0 Y_0 - X_Y 1\|_F^2, \quad 5$$

wherein s represents the coefficient of light intensity of non-naked-eye view, $s_0$ represents the coefficient of light intensity of the naked-eye view, α represents the penalty factor used for adjusting the relative factorization quality of the naked-eye view and the non-naked-eye view, $X_Y$ represents the bases of the luminance in the basis element frames, W represents the modulation weight, Y represents the luminance information of the non-naked-eye view, $Y_0$ represents the luminance information of the naked-eye view.

Further, in the above-described image processing apparatus according to some embodiments of the present disclosure, the second processing circuit 103 can be specifically used for determining the bases of the chrominance in the basis element frames through the following formula according to the predetermined modulation weights and the chrominance information:

$$\min_{0\le X_U\le 1} \|s(U-0.5) - (X_U-0.5)W\|_F^2 + \alpha^2 \|s_0(U_0-0.5) - (X_U-0.5)1\|_F^2;$$

$$\min_{0\le X_V\le 1} \|s(V-0.5) - (X_V-0.5)W\|_F^2 + \alpha^2 \|s_0(V_0-0.5) - (X_V-0.5)1\|_F^2,$$

wherein s represents the coefficient of light intensity of the non-naked-eye view, $s_0$ represents the coefficient of light intensity of the naked-eye view, α represents the penalty factor used for adjusting the relative factorization quality of the naked-eye view and the non-naked-eye view, $X_U$ and $X_V$ represent the bases of the chrominance in the basis element frames, U and V represent the chrominance information of the non-naked-eye view, $U_0$ and $V_0$ represent the chrominance information of the naked-eye view.

Further, in the above-described image processing apparatus according to some embodiments of the present disclosure, the first conversion circuit 101 can be specifically used to determine the chrominance information and the luminance information of the color image through the following formula:

$$\begin{bmatrix} r \\ g \\ b \end{bmatrix} = \begin{bmatrix} 1 & 0 & 1.402 \\ 1 & -0.34414 & -0.71414 \\ 1 & 1.772 & 0 \end{bmatrix} \begin{bmatrix} y \\ u-128 \\ v-128 \end{bmatrix},$$

wherein y represents the luminance information of the color image, u and v represent the chrominance information of the color image, r, g and b respectively represent the RGB input signals of the color image.

Further, in the above-described image processing apparatus provided by some embodiments of the present disclosure, the second conversion circuit 104 can be specifically used for converting the bases of the luminance and the bases of the chrominance in the basis element frames into the RGB output signals of the basis element frames through the following formula:

$$\begin{bmatrix} R \\ G \\ B \end{bmatrix} = \begin{bmatrix} 1 & 0 & 1.402 \\ 1 & -0.34414 & -0.71414 \\ 1 & 1.772 & 0 \end{bmatrix} \begin{bmatrix} X_y \\ X_u-128 \\ X_v-128 \end{bmatrix},$$

wherein $X_Y$ represents the bases of the luminance in the basis element frames, $X_U$ and $X_V$ respectively represent the bases of the chrominance in the basis element frames, R, G, and B respectively represent the RGB output signals of the basis element frames.

Some embodiments of the present disclosure also provide a display system comprising the image processing apparatus. The display system can comprise any products or parts with displaying functions such as mobile phones, tablet computers, televisions, monitors, laptops, digital photo frames, navigation systems, etc. The display system can employ the image processing method described above.

Those of ordinary skill in the art will recognize that the functional blocks, methods, devices, and systems described in the present disclosure may be integrated or divided into different combinations of systems, devices, and functional blocks. Any suitable programming languages and programming techniques may be used to implement the routines of particular embodiments.

Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing circuit, multiple processing circuits, dedicated circuitry for achieving functionality, or other systems.

Processing need not be limited to a geographic location, or have temporal limitations. For example, a processor may perform its functions in "real-time," "offline," in a "batch mode," etc. Portions of processing may be performed at different times and at different locations, by different (or the same) processing systems. Various embodiments disclosed herein can be realized via hardware and/or software, such as a computer program stored on a memory.

The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media such as non-transient computer readable medium suitable for storing instructions for execution by the processor. The software instructions can also be contained in, and provided as, an electronic signal, for example in the form of software as a service (SaaS) delivered from a server (e.g., a distributed system and/or a cloud computing system).

Various embodiments of present disclosure provide an image processing method, an image processing apparatus, and a display system based on PVM. One or more processors or processing circuits described above, such as the first and second converting circuits and the first and the second processing circuits.

First, the input color image can be converted from the RGB format to the YUV format to obtain the luminance information of the color image. The image processing method can further include using the luminance information to solve, through an iterative method, a non-negative matrix factorization equation of PVM to determine the bases of the luminance and the modulation weights of the basis element frames. Various algorithms, such as a block rotation techniques, can be employed in the process.

The bases of the chrominance in the basis element frames can then be determined based on the predetermined modulation weights and the chrominance information. The bases of the luminance and the bases of the chrominance in the basis element frames can then be converted to an output image of the basis element frames.

Because most of the information of the color image is included in the luminance information, the visual quality is not significantly reduced when the sampling rate at the chrominance channel is lower than the sampling rate at the luminance channel.

As such, in the factorization process in PVM, factorizing the luminance information of color image can be first performed to obtain some parameters of the basis element frames (e.g., the bases of the luminance) and the modulation weights, and then other parameters of the basis element frames (e.g., the bases of the chrominance) can be determined from the obtained modulation weights.

Because during the factorization process of PVM only the luminance information is factorized, the processing speed can be drastically increased. In addition, because the bases of the luminance contain most of the information of the color images, only factorizing luminance information can still ensure the quality of reconstructed images.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An image processing method, comprising:
   determining chrominance information and luminance information of an input color image;
   iteratively solving one or more equations to obtain bases of luminance and modulation weights of a plurality of basis element frames of the input color image based on the luminance information;
   determining bases of chrominance of the basis element frames based on the modulation weights and the chrominance information; and
   converting the bases of the luminance and the bases of the chrominance into an output image;
   wherein the one or more equations comprise:

$$\min_{0 \leq X_Y, W \leq 1} \|sY - X_Y W\|_F^2 + \alpha^2 \|s_0 Y_0 - X_Y 1\|_F^2;$$

wherein s represents a light intensity coefficient of the non-naked-eye view, $s_o$ represents a light intensity coefficient of a naked-eye view, a represents a penalty factor for adjusting a relative factorization quality of the naked-eye view and the non-naked-eye view, $X_Y$ represents the bases of the luminance of the basis element frames, W represents the modulation weight, Y represents the luminance information of the non-naked-eye view, $Y_0$ represents the luminance information of the naked-eye view.

2. The method of claim 1, wherein the one or more equations comprise a non-negative matrix factorization equation of temporal psychovisual modulation (TPVM).

3. The method of claim 1, wherein the determining the bases of the chrominance comprises solving:

$$\min_{0 \leq X_U \leq 1} \|s(U - 0.5) - (X_U - 0.5)W\|_F^2 + \alpha^2 \|s_0(U_0 - 0.5) - (X_U - 0.5)1\|_F^2,$$

$$\min_{0 \leq X_V \leq 1} \|s(V - 0.5) - (X_V - 0.5)W\|_F^2 + \alpha^2 \|s_0(V_0 - 0.5) - (X_V - 0.5)1\|_F^2,$$

wherein $X_U$ and $X_V$ represent the bases of the chrominance of the basis element frames, U and V represent the chrominance information of the non-naked-eye view, $U_0$ and $V_0$ represent the chrominance information of the naked-eye view.

4. The method of claim 3, further comprising:
determining the chrominance information and the luminance information of the input color image by solving:

$$\begin{bmatrix} r \\ g \\ b \end{bmatrix} = \begin{bmatrix} 1 & 0 & 1.402 \\ 1 & -0.34414 & -0.71414 \\ 1 & 1.772 & 0 \end{bmatrix} \begin{bmatrix} y \\ u - 128 \\ v - 128 \end{bmatrix},$$

wherein y represents the luminance information of the input color image, u and v represent the chrominance information of the input color image, r, g, and b represent RGB input signals of the input color image.

5. The method of claim 3, wherein the converting comprises:
converting the bases of the luminance of the basis element frames and the bases of the chrominance of the basis element frames into output RGB signals of the basis element frames through:

$$\begin{bmatrix} R \\ G \\ B \end{bmatrix} = \begin{bmatrix} 1 & 0 & 1.402 \\ 1 & -0.34414 & -0.71414 \\ 1 & 1.772 & 0 \end{bmatrix} \begin{bmatrix} Xy \\ Xu - 128 \\ Xv - 128 \end{bmatrix},$$

wherein $X_Y$ represents the bases of the luminance of the basis element frames, $X_U$ and $X_V$ represent the bases of the chrominance of the basis element frames, R, G, and B respectively represent output RGB signals of the basis element frames.

6. An image processing apparatus, comprising:
a first converting circuit configured to determine chrominance information and luminance information of an input color image;
a first processing circuit configured to iteratively solve one or more equations to obtain bases of the luminance and modulation weights of a plurality of basis element frames of the input color image based on the luminance information;

a second processing circuit configured to determine bases of the chrominance of the basis element frames based on the modulation weights and the chrominance information; and a second converting circuit configured to convert the bases of the luminance and the bases of the chrominance of the basis element frames into an output image;

wherein the second processing circuit is configured to determine:

$$\min_{0 \le X_U \le 1} \|s(U-0.5)-(X_U-0.5)W\|_F^2 + \alpha^2 \|s_0(U_0-0.5)-(X_U-0.5)1\|_F^2,$$

$$\min_{0 \le X_V \le 1} \|s(V-0.5)-(X_V-0.5)W\|_F^2 + \alpha^2 \|s_0(V_0-0.5)-(X_V-0.5)1\|_F^2,$$

wherein $X_U$ and $X_V$ represent the bases of the chrominance of the basis element frames, U and V represent the chrominance information of the non-naked-eye view, $U_0$ and $V_0$ represent the chrominance information of the naked-eye view.

7. The apparatus of claim 6, wherein the input color image includes a naked-eye view and a non-naked-eye view.

8. The apparatus of claim 7, wherein the non-naked-eye view is configured to be viewed through a light modulator.

9. The apparatus of claim 8, wherein the light modulator comprises an auxiliary viewing device.

10. The apparatus of claim 9, wherein the auxiliary viewing device comprises at least one of: liquid crystal glasses, a helmet mounted display, a virtual reality device, or an augmented reality device.

11. The apparatus of claim 6, wherein the first processing circuit is configured to solve a non-negative matrix factorization equation of psychovisual modulation (PVM).

12. The apparatus of claim 11, wherein the PVM comprises a temporal PVM (TPVM).

13. The apparatus of claim 11, wherein the first processing circuit is configured to solve a non-negative matrix factorization equation of TPVM.

14. The apparatus of claim 11, wherein the one or more equations comprise:

$$\min_{0 \le X_Y, W \le 1} \|sY - X_Y W\|_F^2 + \alpha^2 \|s_0 Y_0 - X_Y 1\|_F^2$$

based on the luminance information of the color image to obtain the bases of the luminance and the modulation weights of the basis element frames;

wherein s represents a light intensity coefficient of the non-naked-eye view, $s_o$ represents a light intensity coefficient of a naked-eye view, α represents a penalty factor for adjusting a relative factorization quality of the naked-eye view and the non-naked-eye view, $X_Y$ represents the bases of the luminance of the basis element frames, W represents the modulation weight, Y represents the luminance information of the non-naked-eye view, $Y_0$ represents the luminance information of the naked-eye view.

15. The apparatus of claim 14, wherein the apparatus is further configured to:

determine the chrominance information and the luminance information of the input color image by solving:

$$\begin{bmatrix} r \\ g \\ b \end{bmatrix} = \begin{bmatrix} 1 & 0 & 1.402 \\ 1 & -0.34414 & -0.71414 \\ 1 & 1.772 & 0 \end{bmatrix} \begin{bmatrix} y \\ u-128 \\ v-128 \end{bmatrix},$$

wherein y represents the luminance information of the input color image, u and v represent the chrominance information of the input color image, r, g, and b represent RGB input signals of the input color image.

16. The apparatus of claim 14, wherein the apparatus is further configured to:

convert the bases of the luminance of the basis element frames and the bases of the chrominance of the basis element frames into output RGB signals of the basis element frames through:

$$\begin{bmatrix} R \\ G \\ B \end{bmatrix} = \begin{bmatrix} 1 & 0 & 1.402 \\ 1 & -0.34414 & -0.71414 \\ 1 & 1.772 & 0 \end{bmatrix} \begin{bmatrix} X_y \\ X_u-128 \\ X_v-128 \end{bmatrix},$$

wherein $X_Y$ represents the bases of the luminance of the basis element frames, $X_U$ and $X_V$ represent the bases of the chrominance of the basis element frames, R, G, and B respectively represent output RGB signals of the basis element frames.

17. A display system, comprising:
an image processing apparatus including:
a first converting circuit configured to determine chrominance information and luminance information of an input color image;
a first processing circuit configured to iteratively solve one or more equations to obtain bases of the luminance and modulation weights of a plurality of basis element frames of the input color image based on the luminance information;
a second processing circuit configured to determine bases of the chrominance of the basis element frames based on the modulation weights and the chrominance information; and
a second converting circuit configured to convert the bases of the luminance and the bases of the chrominance of the basis element frames into an output image; and
an auxiliary viewing device configured to modulate an output image from the image processing apparatus;
wherein the second processing circuit is configured to determine:

$$\min_{0 \le X_U \le 1} \|s(U-0.5)-(X_U-0.5)W\|_F^2 + \alpha^2 \|s_0(U_0-0.5)-(X_U-0.5)1\|_F^2,$$

$$\min_{0 \le X_V \le 1} \|s(V-0.5)-(X_V-0.5)W\|_F^2 + \alpha^2 \|s_0(V_0-0.5)-(X_V-0.5)1\|_F^2,$$

wherein $X_U$ and $X_V$ represent the bases of the chrominance of the basis element frames, U and V represent the chrominance information of the non-naked-eye view, $U_0$ and $V_0$ represent the chrominance information of the naked-eye view.

18. The display system of claim 17, wherein the auxiliary viewing device comprises at least one of liquid crystal glasses, a helmet mounted display (HMD), a virtual reality (VR) device, or an augmented reality (AR) device.

* * * * *